UNITED STATES PATENT OFFICE.

FREDERICK ARTHUR ELLIS, OF LONDON, ENGLAND.

ALLOY.

SPECIFICATION forming part of Letters Patent No. 587,303, dated August 3, 1897.

Application filed July 13, 1896. Serial No. 599,018. (No specimens.)

*To all whom it may concern:*

Be it known that I, FREDERICK ARTHUR ELLIS, residing at London, England, have invented Improvements in the Soldering or Brazing of Metals Particularly Applicable to Aluminium Alloys, of which the following is a specification.

This invention relates to improvements in the soldering or brazing of metals particularly applicable to aluminium alloys; and it consists in the composition of a solder or braze for the purpose.

It is well known that one of the greatest practical difficulties in the use of aluminium alloys for various purposes, such as the manufacture of cycle-frames or of instruments, to which aluminium is eminently adaptable, is to obtain homogeneous adhesion of the metal by soldering, brazing, or welding. To effect this by my invention, I prepare the face or faces of one part to be soldered, brazed, or united to another by raising its or their temperature closely to the melting-point of the surface of the aluminium alloy, but without reaching such actual melting-point. I then apply the braze, constituted as hereinafter described, to the heated end of the tube or of one part of the material to be united, care being taken that all surface oxidations or impurities are first removed. I thus incorporate a braze with the actual metal of the aluminium tube or of one surface to be united. The solder or braze I use is essentially composed of the four metals, copper, spelter, tin, and aluminium, each of which fulfils an important function in the braze, and in which the tin and aluminium are combined in the proportion of their combining equivalents— viz., as one hundred and eighteen of tin to 27.4 of aluminium by weight, and these two metals form together at least five-sixths by weight of the solder or braze, the remaining one-sixth being made of variable quantities of copper and spelter to discretion. A convenient proportion of weights of parts reduced to their simplest denomination is one ounce of pure aluminium, 4.3 ounces of pure grain tin, one-half ounce of refined copper, and one-fourth ounce of spelter. This braze or solder is for use with aluminium surfaces or with almost any metal, such as steel, zinc, brass, or copper, to be united to the aluminium alloy.

To prepare the braze, I first melt the copper and add the spelter, thus forming a bronze, and to this I add the aluminium and mix these well in a state of fusion with a pure copper stick and finally add the tin and allow the mixture or braze to stand in the furnace and stir with the copper stick until completely alloyed, and continue the stirring while cooling until completely set.

The preparation of articles made of aluminium alloy in the above manner, with the employment of the braze of composition as above defined, enables me to run by casting bosses, sockets, or other additions of aluminium alloy upon the said prepared piece, stem, or portion of the alloy and to obtain after such casting a perfect and reliable fusion of the braze or solder and a homogeneous incorporation or brazed joint between the cast added piece and that upon which the addition has been cast. This enables me to attach by my method sockets or parts of aluminium alloys upon tubes or parts of the same material with perfect fusion of the solder or braze and perfect homegeneity of joints, unbreakable by any amount of jar or vibration, and also to solder or braze ends and ferrules or bushes of steel or other metal into tubes or onto parts made of aluminium alloy where such additions are desirable.

Having now particularly described and ascertained the nature of my invention and in what manner the same is to be performed, I declare that what I claim is—

1. The composition of an aluminium braze of which the essentials are that about five-sixths of the compound by weight is composed of pure grain tin and pure aluminium in the proportion of their atomic weights and the remaining part of about one-sixth is made up of copper and spelter, substantially as described.

2. The composition of an aluminium braze consisting of one ounce of pure aluminium 4.3 ounces of pure grain tin, one-half ounce of refined copper and one-fourth ounce of spelter.

In testimony whereof I have signed my name to this specification in the presence of two subscribing witnesses.

FREDERICK ARTHUR ELLIS.

Witnesses:
RICHARD A. HOFFMANN,
CHARLES H. CARTER.